United States Patent Office 3,105,842  
Patented Oct. 1, 1963

---

3,105,842
1-DEHYDRO-11α-HYDROXY-PROGESTERONE
Richard W. Thoma, Somerville, and Josef Fried, Princeton, N.J., assignors to Olin Mathieson Chemical Corporation, New York, N.Y., a corporation of Virginia
No Drawing. Original application Apr. 6, 1956, Ser. No. 576,543, now Patent No. 2,880,217, dated Mar. 31, 1959. Divided and this application Dec. 16, 1958, Ser. No. 780,673
1 Claim. (Cl. 260—397.45)

This application is a division of our parent application, Serial No. 576,543, filed April 6, 1956, now Patent No. 2,880,217, granted March 31, 1959.

This invention relates to, and has for its object, the provision of the new steroid, 1-dehydro-11α-hydroxy-progesterone. This steroid is prepared by subjecting 11α-hydroxyprogesterone to the action of enzymes of the microorganism *Corynebacterium simplex* under aerobic conditions. The 1-dehydrogenation can best be effected by either including the steroid in an aerobic culture of the microorganism, or by bringing together, in an aqueous medium, the steroid, air and enzymes of non-proliferating cells of the microorganism.

In general, the conditions of culturing *Corynebacterium simplex* for the purposes of this invention are (except for the inclusion of the steroid to be converted) the same as those of culturing various other bacteria for the production of organic acids or glycols, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose starch or dextrin), a fatty acid, a fat and/or the steroid itself. Preferably, however, the medium includes an assimilable source of carbon and energy in addition to the steroid. The source of nitrogenous factors may be organic (e.g. soybean meal, corn steep liquor, meat extract and/or distillers' solubles) or synthetic (i.e., composed of simple, synthesizable organic and inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation.

The process yields, inter alia, 1-dehydro-11α-hydroxy-progesterone which is useful as an intermediate in the preparation of the 1-dehydro-11-ketoprogesterone steroid of this invention. 1-dehydro-11-ketoprogesterone is a physiologically-active steroid which possesses progestational activity. Thus, it can be used in lieu of known progestational steroids, such as progesterone, in the treatment of menopausal disturbances, being formulated for such administration in the same type of preparations as progesterone, for example, with concentration and/or dosage based on the activity of the steroid. This conversion of the 11α-hydroxy steroid of this invention to 1-dehydro-11-ketoprogesterone is effected by treatment of the steroid with chromic acid and sulfuric acid in an inert solvent (e.g. acetone and dioxane).

The following examples are illustrative of the invention (all temperatures being in centigrade):

EXAMPLE 1

*Preparation of 1-Dehydro-11α-Hydroxyprogesterone*

(a) *Fermentation.*—Surface growth of a 3 week old agar slant of *Corynebacterium simplex* (American Type Culture Collection No. 6946), the slant containing as a nutrient medium (A)

| | G. |
|---|---|
| Beef extract | 1.5 |
| Yeast extract | 3.0 |
| Peptone | 6.0 |
| Glucose | 1.0 |
| Agar | 20 |
| Distilled water to 1 liter. | | is suspended in 12 ml. of water. One-half ml. of suspension is used to inoculate 11 flasks each containing 50 ml. of the following medium (B):

| | | |
|---|---|---|
| Glucose | g__ | 20 |
| Peptone | g__ | 5 |
| Tryptone | g__ | 5 |
| Yeast extract | g__ | 5 |
| $CaCO_3$ | percent__ | 0.25 |
| Distilled water to 1 liter. | | |

After 19 hours' incubation at 25° on a 280 cycle per minute 2-inch radius rotary shaker, 3% (vol./vol.) transfer is made to 94 flasks each with 100 ml. of the following medium: 0.1% glucose, 0.1% yeast extract, 0.1% $KH_2PO_4$, in distilled water adjusted to pH 7.0 before autoclaving 20 minutes at 120°. After 29 hours incubation on a 120 cycle per minute 1.5 inch displacement reciprocating shaker, 9.4 g. of 11α-hydroxyprogesterone is added in 94 ml. of absolute methanol, 1 ml. per flask. After 22 hours further incubation, 5 ml. of chloroform, 0.2 g. of powdered cellulose, and 0.05 ml. of 12 N sulfuric acid are added to each flask and the contents are shaken. Aqueous layers are decanted on to a Seitz filter pad. Chloroform layers are combined, passed through the pad, and the pads are then washed with several portions of chloroform. The volume of the aqueous layer is about 9695 ml. and that of the chloroform layer about 945 ml.

(b) *Isolation of 1-dehydro-11α-hydroxyprogesterone.*—The layers are separated and the aqueous layer is extracted with four 3 liter portions of chloroform, and all the combined chloroform extracts evaporated to dryness in vacuo. The residue (about 2.8 g.) is crystallized from acetone, and yields about 750 mg. of crude crystalline 1-dehydro-11α-hydroxyprogesterone, which after additional crystallization from 95% alcohol has the following properties: M.P. 228–230°; $[\alpha]_D^{23}$ +93° (c., 0.43 in $CHCl_3$);

$\lambda_{max}^{alc.}$ 246 m$\mu$; ($\epsilon$ = 18,100);

$\lambda_{max}^{Nujol}$ 2.94$\mu$, 5.89$\mu$, 6.05$\mu$, 6.19$\mu$, 6.2$\mu$8

*Analysis.*—Calcd. for $C_{21}H_{28}O_3$ (328.44): C, 76.79; H, 8.59. Found: C, 77.04; H, 8.36.

EXAMPLE 2

*Preparation of 1-Dehydro-11-Ketoprogesterone*

To a solution of 100 mg. of 1-dehydro-11α-hydroxyprogesterone in 10 ml. of reagent grade acetone is added at room temperature with stirring 0.1 ml. of a solution of 200 mg. of chromic acid and 320 mg. of sulfuric acid in 1 ml. of water. After 15 minutes, a few drops of alcohol are added and the mixture diluted with water. After removal of the acetone in vacuo, the residual mixture is extracted with chloroform, the chloroform extract washed with water, dilute sodium bicarbonate and water, dried over sodium sulfate and evaporated to dryness in vacuo. The residue (about 96 mg.), after recrystallization from acetone-hexane, furnished pure 1-dehydro-11-ketoprogesterone of the following properties: M.P. 170–172°; $[\alpha]_D^{23}$ −223° (c., 0.62 in chloroform);

$\lambda_{max}^{alc.}$ 238 m$\mu$ ($\epsilon$=15,300); $\lambda_{max}^{Nujol}$ 5.86$\mu$, 5.99$\mu$, 6.14$\mu$, 6.23$\mu$

*Analysis.*—Calcd. for $C_{21}H_{26}O_3$ (326.42): C, 77.27; H, 8.03. Found: C, 77.40; H, 8.15.

The invention may be variously otherwise embodied within the scope of the appended claim.

What is claimed is:

1-dehydro-11α-hydroxyprogesterone.

References Cited in the file of this patent

UNITED STATES PATENTS

| | | |
|---|---|---|
| 2,883,400 | Eppstein et al. | Apr. 21, 1959 |
| 2,902,410 | Weintraub et al. | Sept. 1, 1959 |

OTHER REFERENCES

Vischer et al.: Helv. Chim Acta, vol. 38, pp. 835–840, May 1, 1955.